United States Patent [19]

Meltzer et al.

[11] Patent Number: 4,928,345

[45] Date of Patent: May 29, 1990

[54] HEATED WINDSHIELD WIPER BLADE AND HOLDER

[75] Inventors: Elliott A. Meltzer, Cherry Hill, N.J.; Albert A. DiIoia, Willow Grove, Pa.

[73] Assignee: Thermo-Blade, Inc., Bensalem, Pa.

[21] Appl. No.: 351,292

[22] Filed: May 10, 1989

Related U.S. Application Data

[63] Continuation of Ser. No. 123,682, Nov. 23, 1987, abandoned.

[51] Int. Cl.$^5$ .............................. B60S 1/04; B60L 1/02
[52] U.S. Cl. ............................... 15/250.06; 15/250.42; 219/203
[58] Field of Search ........... 15/250.05, 250.06, 250.07, 15/250.08, 250.09, 250.42

[56] References Cited

U.S. PATENT DOCUMENTS

| | | | |
|---|---|---|---|
| 2,677,143 | 5/1954 | Blaney . | |
| 2,790,194 | 4/1957 | Norine . | |
| 3,074,096 | 1/1963 | Van Hess . | |
| 3,408,678 | 11/1968 | Linker . | |
| 3,428,993 | 2/1969 | Rickett | 15/250.06 |
| 3,489,884 | 1/1970 | Waseleski | 15/250.05 |
| 3,530,525 | 9/1970 | Abel | 15/250.07 |
| 3,619,556 | 11/1971 | Deibel et al. . | |
| 3,639,938 | 2/1972 | Golden | 15/250.06 |
| 3,942,212 | 3/1976 | Steger et al. | 15/250.42 |
| 4,007,511 | 2/1977 | Deibel | 15/250.42 |
| 4,194,261 | 3/1980 | Parkinson | 15/250.07 |
| 4,360,941 | 11/1982 | Mabie . | |
| 4,497,083 | 2/1985 | Nielsen, Jr. et al. . | |
| 4,603,451 | 8/1986 | Van Sickle | 219/203 |

FOREIGN PATENT DOCUMENTS

| | | | |
|---|---|---|---|
| 2585649 | 2/1987 | France | 15/250.05 |
| 572184 | 1/1958 | Italy | 15/250.42 |

*Primary Examiner*—Harvey C. Hornsby
*Assistant Examiner*—Joseph S. Machuga
*Attorney, Agent, or Firm*—Caesar, Rivise, Bernstein, Cohen & Pokotilow

[57] ABSTRACT

An electrically heated windshield wiper blade and assembly is provided which includes an elongated resilient blade, a blade carrier comprising an elongated body member and a pair of pivotable blade holder end sections located on opposite ends of the body member. The body member of the blade carrier includes a pair of first flexible electrical conductors extending there-through. Each conductor enters the body member and terminates at a first end located beyond a respective end of the body member. The wiper blade includes a relatively long first resistance heating element fully enclosed within a longitudinal passageway and which is electrically connected at each end to a first end of a respective one of a pair of second flexible electrical conductors. Each of the blade holding end sections comprises a hollow sealed portion through which a second resistance heating element extends. A second end of each second conductor is electrically connected to one end of the second heating element within the hollow portion. The other end of the second heating element is connected within the hollow sealed portion to the first end of one of the first conductors. The first conductors are arranged to be connected to an electrical power source so that upon the passage of electrical current therethrough the first heating element in the blade heats the blade while the second heating elements heat the blade holder member sections.

17 Claims, 3 Drawing Sheets

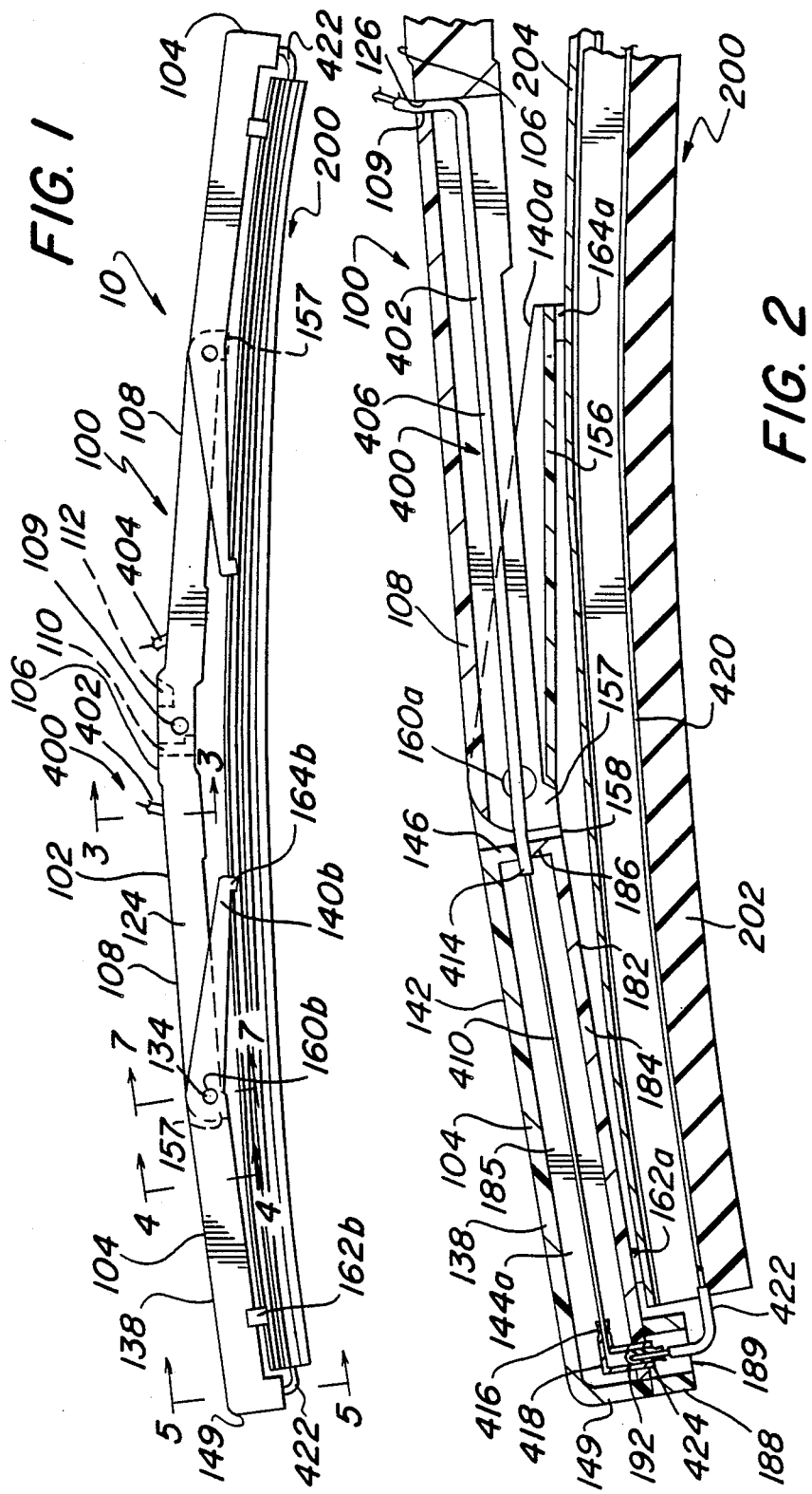

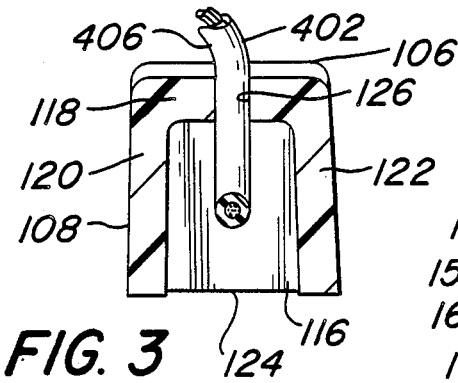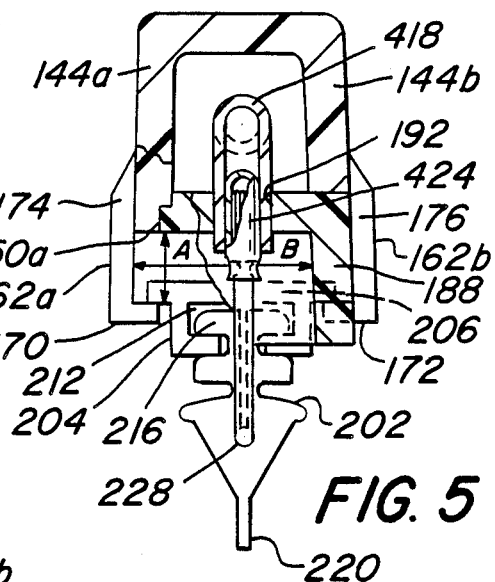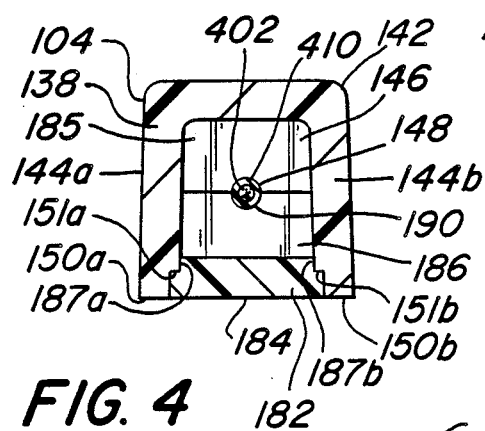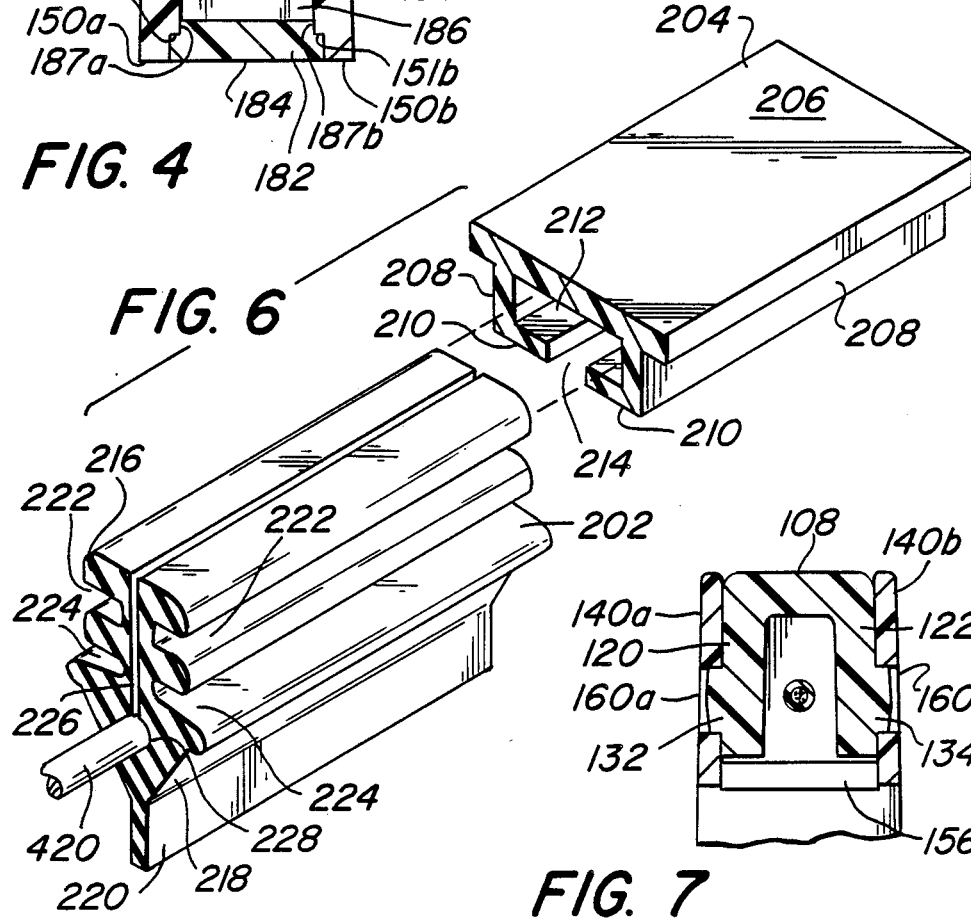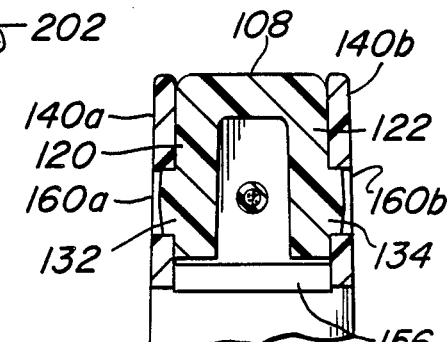

HEATED WINDSHIELD WIPER BLADE AND HOLDER

This application is a continuation of application Ser. No. 123,682, filed 11/23/87 now abandoned.

BACKGROUND OF THE INVENTION

This invention relates generally to windshield wiper assemblies and more particularly to wiper assemblies having heated portions.

As will be appreciated, when a vehicle is operated during snow, sleet or other icy/wet conditions, the defroster for the windshield in addition to performing its normal function, warms the outer surface of the windshield. Thus, the ice and snow which fall on the surface are turned to slush and water and are hopefully wiped away with each sweep of the wiper blade, thereby leaving the windshield clear, at least momentarily. However, what usually happens under such conditions is that the wiper blades do not clear the windshield as effectively as desired for safety purposes. Unfortunately, the blades become encrusted with ice, whereupon they are lifted off the glass by the ice. Furthermore, conventional blade holders, with their system of flexible levers or supports, provide perfect attachment points for the slush and water and allow ice to form and, after a very short time, the blade is not only encrusted with ice, but no longer follows the curvature of the windshield for most or all of its length, due to icing of the holder. The vehicle defroster is incapable of heating the blade and its associated mounting means inasmuch as the blade contact with the glass, i.e., the razor thin wiping edge, is of such a small cross-sectional area. Thus, insufficient heat is exchanged from the windshield into the blade to cause the blade to warm sufficiently to thaw the ice formed thereon, let alone heat the blade holder enough to melt the ice formed thereon. In fact, it has been found that the more efficient the defroster system, the more slush and water it creates on the windshield to freeze on and encrust the blades and holders. Thus, heated wiper blades and holders therefor have been suggested in the patent literature.

Various windshield wiper assemblies have been proposed in the patent literature to effect the melting of ice which might accumulate on the blade. Examples of prior art of patented heated wiper blades and/or assemblies are as follows: U.S. Pat. No. 2,677,143 (Blanie); U.S. Pat. No. 2,790,194 (Noreen); U.S. Pat. No. 3,074,096 (Van Hess); U.S. Pat. No. 3,408,678 (Linker); U.S. Pat. No. 33,530,525 (Abel); U.S. Pat. No. 3,619,556 (Deibel et al.); U.S. Pat. No. 4,325,160 (Burgess); U.S. Pat. No. 4,360,941 (Mabie); and U.S. Pat. No. 4,497,083 (Nielsen, Jr. et al.).

While the devices disclosed in the aforementioned patents appear generally suitable for their intended purposes, they nevertheless leave much to be desired from the standpoint of simplicity of construction, and moreover can be greatly improved in terms of effectiveness of operation.

For example, the patent of Nielsen, Jr. et al, U.S. Pat. No. 4,497,083, discloses a heated windshield wiper blade having a resistance wire running along the length of the wiper arm, the blade carrier and the wiper blade to heat the blade and the carrier when it is connected to a vehicle's electrical system. The path through which the resistance wire travels and its various connections is quite complex in order to provide the blade which can be replaced independently of the arm and carrier.

The patent to Mabie, U.S. Pat. No. 4,360,941, discloses a second, rather complex windshield wiper assembly which incorporates a weather protective hood utilizing electrical conductors affixed on the outer wall of the hood and other conductors affixed on the inner wall of the hood to heat the hood and frame to prevent the accumulation of ice.

None of these patents discloses a wiper blade and carrier arm of simple, economical construction wherein the wiper blade can be both easily constructed and easily replaced in the blade arm.

OBJECTS OF THE INVENTION

Accordingly, it is an object of the present invention to provide a simple, relatively low cost wiper blade assembly, including a wiper blade and a blade holder, each of which are heated, which overcomes the disadvantages of the prior art.

It is a further object of this invention to provide a combination heated wiper blade and a heated blade holder which is simple in construction and effective in operation.

It is yet a further object of this invention to provide a heated wiper blade and a heated holder therefor which permits the wiper blade to conform to the shape of the windshield under snow, sleet or other icy conditions.

A still further object of this invention is to provide a heated wiper blade and a heated holder therefor which can be readily connected to existing windshield wiper arms on various types of vehicles.

SUMMARY OF THE INVENTION

These and other objects of the instant invention are achieved by providing an electrically heated windshield wiper assembly adapted to be mounted on a wiper arm which sweeps across a windshield. The assembly includes an elongated wiper blade formed of a resilient material, a blade carrier comprising an elongated body member and a pair of blade holder end sections pivotably secured at opposite ends of the body member for mounting the blade thereon. The body member is arranged to connect the blade carrier to a wiper arm. The body member of the blade carrier further includes a pair of first electrical conductors formed of a flexible material. Each first conductor terminates at a first end located beyond the respective end of the body member. The wiper blade includes a relatively long, resistance heating element fully enclosed within a longitudinal passageway in the blade. Each end of the heating element terminates within the interior of the passageway and is electrically connected thereat to a first end of a respective one of a pair of second electrical conductors. Each of the second electrical conductors is formed of a flexible material and includes a second end. Each of the blade holder members comprises a hollow sealed portion in which a relatively short, resistance heating element extends. Each of the second ends of the second conductors is electrically connected to one end of the heating element located within one of the hollow sealed portions. The other end of the heating element within the hollow sealed portion of the blade holder member is connected to the first end of a respective one of the first electrical conductors. The first conductors are arranged to be connected to an electrical power source so that upon the passage of electrical current through the electrical conductors the resistance heating element within the blade heats the blade and each of the resistance heating elements within the blade holder members heats the associated blade holder member of the blade carrier.

DESCRIPTION OF THE DRAWINGS

Other objects and many of the attendant advantages of the instant invention will become more readily appreciated when the same become better understood by reference to the following detailed description considered in connection with the accompanying formal drawings wherein:

FIG. 1 is a plan view of a wiper blade and blade assembly constructed in accordance with this invention;

FIG. 2 is an enlarged cross-sectional view of one end of the assembly shown in FIG. 1;

FIG. 3 is an enlarged section view taken along line 3—3 of FIG. 1;

FIG. 4 is an enlarged section view taken along line 4—4 of FIG. 1;

FIG. 5 is an enlarged section view taken along line 5—5 of FIG. 1;

FIG. 6 is an enlarged, exploded perspective view of a portion of the blade and a backing strip therefor as used in the assembly of FIG. 1;

FIG. 7 is an enlarged section view taken along line 7—7 of FIG. 1;

DETAILED DESCRIPTION OF THE PREFERRED EMBODIMENT

Figure 8:
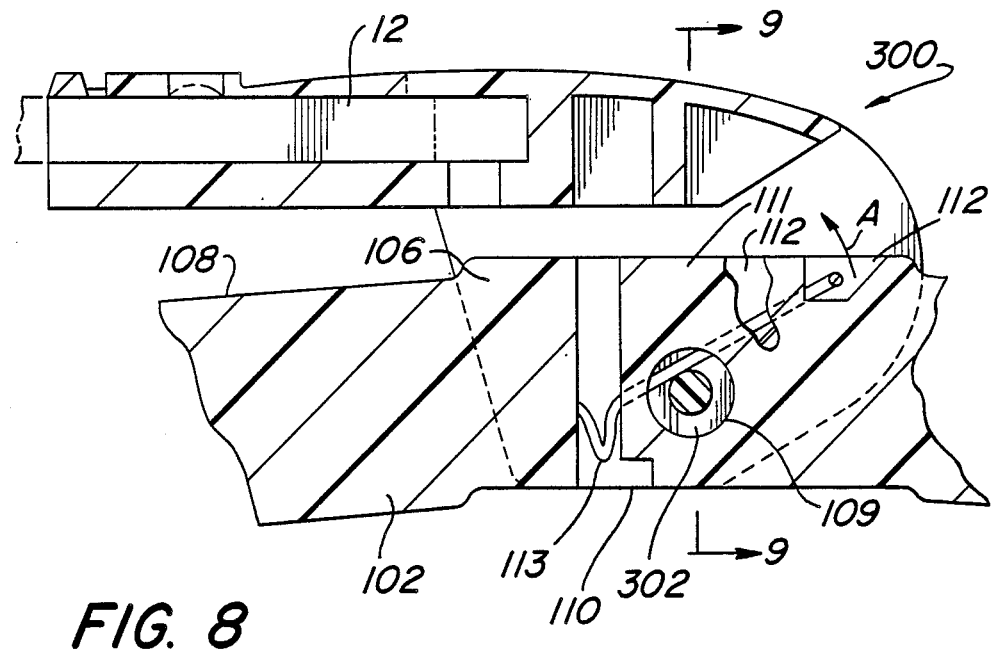
FIG. 8 is a cross-sectional view of the wiper arm adapter.

Referring now in greater detail to the various figures of the drawings wherein like reference characters refer to like parts, there is shown at 10 in FIG. 1 a heated wiper blade and wiper blade carrier assembly. The complete wiper blade and carrier assembly 10 basically comprises a blade carrier 100 and a wiper blade assembly 200 fitted onto the blade carrier 100. A universal adapter 300 (as shown in FIG. 8) may be connected to the blade carrier. The adapter is designed to connect the wiper blade assembly 200 of the blade carrier to a conventional wiper arm 12 of a vehicle. Passing through the blade carrier 100 and the blade assembly 200 is a heating assembly 400 which heats the blade carrier 100 and the blade assembly 200.

The blade carrier 100 (FIGS. 1 and 2) includes a body member 102 and a pair of blade holder members 104, 104 pivotably mounted at each end of the body member 102. As will be discussed further herein, the blade holder members 104, 104 are adapted to receive the blade assembly 200 in such a manner that the blade assembly 200 conforms to the contour of the windshield as it sweeps thereacross. Because the two blade holder members 104, 104 are identical, description will be made with reference to only one.

The universal adapter 300 (FIGS. 8 and 9) is pivotably mounted, via a pin 302, to the body member 102. The adapter serves as the means for connecting the complete unit 10 to any conventional straight end windshield wiper arm 12. The wiper arm 12 is connected to a wiper motor (not shown) in the known manner, and the motor creates the motion which causes the wiper blade assembly 200 to sweep across the windshield in the conventional manner. The use of such an adapter for connecting a wiper assembly to a wiper arm is known in the art.

Referring to FIGS. 2, 5 and 6, details of the blade assembly 200 are shown. As can be seen in FIG. 6, a backing or mounting strip 204 comprises an elongated, channel-shaped member and is preferably formed of a plastics material, such as polyarylate resin. One particularly effective polyarylate resin is that sold by E. I. DuPont under the trademark ARYLON 401. The strip 204 basically comprises a planar base portion 206 from which a pair of flanged rails 208, 208 project. Each of the rails 208, 208 is generally L-shaped and includes a free end portion 210, 210. The free end portion 210 of each of the L-shaped rails 208 extends parallel to the base portion 206, so that a generally rectangularly-shaped channel 212 is defined between the rails 208, 208 and the base portion 206. A slot 214 is formed in the space between the free end portions 210, 210. The channel 212 and the slot 214 serve to receive a mounting portion 216 of a wiper blade member 202 therein in order to secure the blade member 202 to the backing strip 204.

The blade member 202 is formed as an extrusion of a flexible resilient material, such as thermoplastic rubber sold by British Petroleum under the trademark TPR or DuPont's NORDEL. The blade member 202 is an elongated member whose length is the same as that of the backing strip 204. The blade member 202 may be constructed in accordance with the teaching of the aforementioned U.S. Pat. No. 4,325,160 (Burgess), and to that end, the Burgess disclosure is incorporated herein by reference, but is preferably modified as described hereinafter.

The blade member 202 comprises an upper or body mounting portion 216 and a generally triangular wiping portion 218 terminating in a generally planar wiping extension edge 220. The body mounting portion 216 includes two pairs of upper and lower recesses or grooves 222, 222 and 224, 224, respectively, which extend along the length of the blade member 202 on opposite sides thereof. The upper pair of grooves 222, 222 forms a seat for receiving the free end portions 210 of the L-shaped rails 208 of the backing strip 204, so that the body mounting portion 216 of the blade member 202 can be located within the channel 212 (FIG. 5). The pair of lower grooves 224, 224 is provided to form a thin cross-section above the triangular wiping portion 218 which is of approximately the same width as the wiping edge 220. As a result of this construction the maximum area of the wiper blade member 202 comes into contact with the surface of the windshield when the windshield wiper is in operation.

The blade member 202 includes a vertically-oriented slit 226 which extends the entire length of the blade. As can be seen in FIG. 6, the slit 226 extends from the top of the blade through the body mounting portion 216 and terminates in an enlarged longitudinally extending passageway 228 located in approximately the middle of the triangular wiping portion 218. The passageway 228 serves to receive an elongated heating element 420, such as a solid body nichrome wire heating element, therein. The slit 226 serves as the means for inserting the heating element 420 into the body of the wiper blade in the passageway 228. The heating element 420 is positioned within the passageway, and the slit 226 is sealed, such as by use of an adhesive (not shown) to entrap the heating element 420 within the blade member 202. As can be seen in FIG. 2, the heating element 420 extends nearly the entire length of the blade member 202, and each end of the heating element 420 terminates at a point just slightly within the passageway. This feature is of considerable importance, because it ensures that none of the heating element 420 is exposed or extends outside the blade member 202 where it would need to flex or bend substantially.

As will be appreciated by those skilled in the art and as will be discussed herein later, when electric current passes through the heating element 420 the element heats and the heat is conducted into the body of the blade member 202, thereby heating the blade.

As more particularly shown in FIGS. 1 and 3, the body member 102 of the blade carrier 100 includes a central portion 106 and two side portions 108, 108 extending outward at an angle from the central portion 106. The central and side portions are preferably integrally formed of a molded plastics material such as VALOX 420, a polyester containing 30% glass.

The central portion 106 includes a hole 109 (FIG. 3) extending transversely therethrough. If the wiper arm 12 is the type which has a pin connection at the end thereof, the pin is inserted through the hole 109 in the usual manner to connect the body member 102 to the wiper arm. If, however, the wiper arm is the straight end type, the universal adapter 300 is connected to the body member 102 by aligning the holes through the adapter with the hole 109 through the body member 102 and inserting a pin 302 (FIG. 8) through the aligned holes, and the straight end of the arm is fitted into the adapter 300. For either type of wiper arm, the pin extending through the hole 109 is held in place by a spring 113, as will be discussed later.

Figure 9:
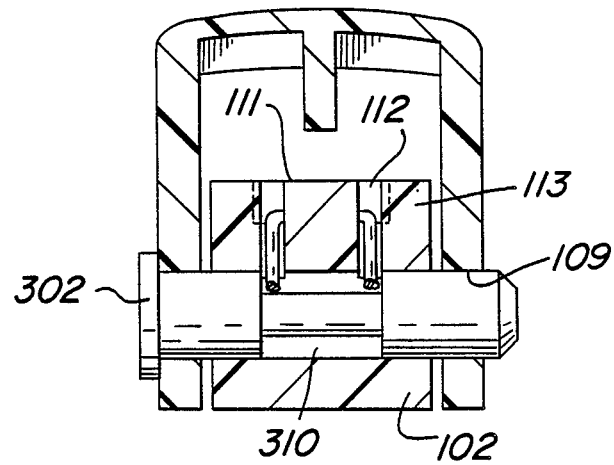
FIG. 9 is a section view along line 9—9 of FIG. 8.

As seen clearly in FIGS. 8 and 9, an L-shaped vertical opening 110 extends completely through the central portion 106 of the body member 102 from top to bottom. A cavity 112 is angled downward from the top surface of the central portion 106 and intersects the opening 110 along the length thereof. A projection 111 extends upward midway between the sidewalls of the cavity 112. The hole 109 passes through at least a portion of the cavity 112 and the projection 111. The cavity 112 and vertical opening 110 cooperate to house a generally U-shaped spring 113 which urges against the pin 302 in the hole 109 to hold the pin in place. The spring 113 is inserted into the opening 110 with each leg on an opposite side of the projection 111 to surround it. The spring is then urged toward the bottom of the cavity 112 on each side of the projection 111. The pin 302 includes an annular recess 310. It is necessary to urge the spring upward to move the spring and enable the pin 302 to be inserted through the opening 109. When the spring 113 is released it forces against the pin 302 and holds it securely within the opening 109. As shown in FIG. 9, the spring 113 surrounds the projection 111 and fits within the recess 310 in the pin, whereby the pin 302 cannot be removed until the spring 113 is urged out of the recess 310.

As more particularly shown in FIG. 3, the central portion 106 of the body member 102, except for the openings 109, 110 and cavity 112 therein, is solid. However, each of the side portions 108 of the body member is of a generally inverted U-shape including a central cavity 116 extending therealong substantially the entire length of the side portion. Thus each side portion of the body member has a top 118, two downwardly directed sidewalls 120, 122 and an opening 124 between the two sidewalls 120, 122 and serving as the entrance to the cavity 116. A hole 126 (FIG. 2) extends through the top surface 118 of each side portion 108, 108 at a location closely adjacent the central portion 106. As shown in FIGS. 1 and 7, at the free end of each side portion 108, a pair of bosses 132, 134 are provided. The bosses 132 and 134 extend outwardly from the sidewalls 120, 122, respectively, and serve as means for pivotably mounting the blade holder members on the body member as shown in FIGS. 1, 2 and 7. As stated previously, the blade holder members 104, 104 are identical; therefore, description will be directed to only one holder.

Each blade holder (FIG. 1) member 104 includes a body portion 138 and a pair of spaced arms 140a, 140b extending parallel to each other at an angle from the body portion 138. The body portion 138 is U-shaped (FIG. 4) in with a top 142, two sidewalls 144a and 144b extending downward from the top, and a first endwall 146 having a semi-circular recess 148 in the bottom edge thereof. The other end of the body portion 138 is a second endwall 149 (FIG. 2). The endwall 149 extends between the sidewalls 144a and 144b.

The spaced arms 140a, 140b of the blade holder member 104 are tapered in shape, and as noted earlier extend directly away from the first endwall 146 and then angle downward. A base member 156 extends between the bottom edges of the two spaced arms 140a, 140b along almost their entire length. The base does not extend up to the endwall 186 thus providing an open space 158 between the arms 140a, 140b immediately adjacent the endwall 146.

Also provided through the arms 140a, 140b are aligned openings 160a, 160b, respectively. The aligned openings 160a, 160b serve as means for pivotably mounting the blade holder members onto the body member. To that end, the openings are of a diameter sufficient to receive the bosses 132, 134 on the sidewalls 120, 122 of the side portions 108, 108 of the body member 102 and allow the bosses to snapfit therein (FIG. 7).

At two locations spaced from each other along each blade holder member 104, 104 are two pairs of brackets 162a, 162b and 164a, 164b. These brackets serve as the means for mounting the blade and its backing strip onto the blade holder members. Thus, as can be seen the brackets extend downward beneath the sidewalls 144a, 144b and the arms 140a, 140b, respectively. As shown in FIG. 5, each pair of brackets 162a, 162b includes two substantially L-shaped members confronting each other. The lower edge 170, 172 of each member is spaced from the bottom edges 150a, 150b of the sidewalls 144a, 144b or the arms 140a, 140b by a distance A sufficient to receive the thickness of the base portion 206 of the backing strip 204 thereinbetween. Equally as important, the side members 174, 176 of each bracket must be spaced a distance B sufficient to allow the width of the base portion 206 to fit therebetween, while the distance between the ends of the lower edges 170, 172 of each L-shaped bracket 162a, 162b must be narrow enough to prevent the base portion 206 of the backing strip 204 from falling therebetween.

As further shown in FIG. 4, the lower edges 150a, 150b of the two sidewalls 144a, 144b of the body position 138 include notches 151a, 151b, respectively, formed along the length thereof. These notches 151a, 151b are adapted to receive a filler strip 182. That strip serves to fill the open space at the underside of the body portion 138 and thereby creates a hollow chamber 185 (FIG. 2) within the blade holder member 104. The filler strip 182, as further shown in FIG. 2, includes a bottom wall portion 184, an endwall portion 186 projecting upward normally therefrom at one end of the bottom wall portion and an open sleeve 188 projecting downward normally from the other end of the bottom wall portion 184. The filler strip 182 is also preferably made of molded plastic material, such as VALOX, like the central portion 106 of the blade carrier 100.

The endwall 186 has a semi-circular recess 190 in the middle of the top edge thereof (FIG. 4). The recess 190 aligns with the recess 148 in the first endwall 146 of the body portion 138 when the filler strip 182 is inserted into the open space on the underside of the body portion 138 and forms a circular passageway through which an electrical conductor, to be described later, passes.

The bottom wall portion 184 of filler strip 182 has two notches 187a, 187b along the top edges thereof. These notches 185a, 185b are received within the notches 151a, 151b, respectively, in the sidewalls 144a, 144b when the filler strip 182 is inserted into the underside of the body portion 138 as shown in FIG. 4.

The open sleeve 188 (FIG. 2) has an outside shape corresponding to the curved second endwall member 149 and includes an opening 189 therethrough. The bottom wall portion of the filler strip also has a hole 192 extending therethrough. That hole communicates with the opening 189 in the sleeve 188 to enable a portion of an electrical conductor to pass therethrough (as will be described later).

The heating assembly 400 includes two flexible electrical conductors 402, 404 which extend into the body member 102 of the blade carrier 100 through the two openings 126. Each conductor 402, 404 extends through an associated one of the side portions 108 of the body member 102, through the passageway formed by the two semi-circular openings 148, 190, and into the hollow chamber 185 in the associated blade holder member 104. The electrical conductors 402, 404 each comprise an insulated wire portion 406, which extends into and through respective side portions 108, 108.

An elongated heating element 410 is provided within each blade holder member 104 and is electrically connected at one end 414 to an associated wire portion 406. At the end 416 opposite end 414, the heating element 410 is connected to an L-shaped plug 418 which fits through the opening 192 in the filler strip 184 and extends into the opening 189 in the sleeve 188.

The insulated wire 406 is preferably a 19-strand, 20 gauge wire coated with an electrically-insulative vinyl coating. The heating element 410 is a conventional resistance heating element, e.g., a nichrome wire. Such wires are effective heating members but are relatively inflexible and subject to degradation when exposed to moisture and bending stresses. Each nichrome element 410 is welded at its end 414 to the 20 gauge wire. The plug 418 is a female electrical plug designed to receive a male plug therein in electrical contact.

The heating assembly 400 further includes a second elongated heating element 420. That element is positioned within the passageway 228 in the blade member 202. In the preferred embodiment, the heating element 420 is recessed within the passageway 228 at each end of the blade and is at each end electrically connected to electrical conductors 422, 422 similar to the electrical conductors 402, 404. These electrical conductors 422, 422 have a male electrical plug 424 (FIG. 5) at the end thereof opposite the end connected to the heating element 420, and the plugs 424, 424 are designed to join in electrical contact with the female plugs 418, 418 connected to the first heating elements 410, 410.

Like the first heating elements 410, 410 the second heating element 420 is preferably a nichrome wire, and the electrical conductors 422, 422 are preferably a 19-strand, 20 gauge wire having a vinyl coating. The heating element 420 is preferably soldered or welded to the wire of the electrical conductors 422, 422. The plugs 424, 424 are preferably crimped to the 19-strand, 20 gauge wires of the conductors 422, 422.

The blade holder member 104 is assembled by inserting the female plug 418 into the hole 192 and stretching the heating element 410 along the length of the body portion 138 of the side portion 108. The wire portion 406 is positioned into the opening 148 in the first endwall 146. The filler member 182 is then forced between the two sidewalls 144a, 144b (FIG. 4) until the notches 187a, 187b and 185a, 185b abut each other and the second endwall 186 abuts the bottom edge of the first endwall 146, thereby surrounding the wire 406 within the semi-circular opening 190 in the second endwall 186. The filler strip 182 is affixed to the body 138 by adhesive or preferably by ultrasonically welding the two together.

After each blade holder member 104, 104 is assembled, the electrical conductors 402, 404 are extended along the length of the side portions 108, 108 of the body member 102 and out the respective openings 126, 126. The electrical conductors 402, 404 are thereafter connected to an electrical source. The blade holder members 104, 104 are then snap-fitted onto the side portions 108, 108 by fitting the bosses 132, 134 on the side portion into the aligned openings 160a, 160b in arm members 140a, 140b of the blade holder members 104, 104. The fit is loose enough so that the blade holder member 104 pivots on the bosses 132, 134. Also, as shown in FIG. 2, the free ends of the side portions 108, 108 are in the form of tips 157, 157 which extend into the openings 158, 158 in the blade holder members 104, 104. Each tip 157 abuts the adjacent base member 156 when the blade holder member is pivoted on the bosses in order to act as a stop to check the amount of rotation of the holder member.

After both blade holder members 104, 104 have been mounted onto the side portions 108, 108, the blade member 202, which is already prepared with the heating element 420 therein and the electrical conductors 422, 422 having the male plugs 424, 424 thereon extending out each end thereof, is slipped into the channel 212 of the backing strip 204. The backing strip 204 and the blade member 202 are fitted into the brackets 162a, 162b and 164a, 164b of each blade holder 104, 104. When the blade member 202 is positioned with the brackets, the male plug 424 attached at each end of the conductors 422, 422 is inserted into the female plug 418 mounted in the opening 192 in each filler strip 184, thereby electrically connecting the electrical conductors 422, 422 and the heating element 420 to the heating elements 410, 410 and the electrical conductors 402, 404 through the blade holder members 104, 104 and the side portions 108, respectively.

When the heating assembly 400 is energized with electrical current, the heating elements 410, 410 and 420 are heated to prevent ice build-up and thus ensure the full functioning of the blade when wiping the windshield. Furthermore, the blade holders 104, 104 are prevented from icing which prohibits their ability to pivot and thus conform the blade member to the shape of the windshield. The heating assembly may be connected to the electrical system of the vehicle in any known manner which will direct electrical current into and through the heating assembly 400.

In an alternate embodiment (not shown) the side portions 108, 108 may also be enclosed at the opening 124 (FIG. 3) on the underneath side thereof and a rigid heating element (e.g., a nichrome wire) extended therethrough instead of the conductors 402, 404 in a manner similar to the positioning of the heating element 410 in the blade holders in order to heat the side portions as well.

The adapter 300 which is provided to connect the blade carrier 100 to the wiper arm 12 is, basically, of a standard configuration known to those skilled in the art and has not been discussed at length herein. As shown in FIGS. 8 and 9, the adapter 300 is mounted onto the blade carrier 100 by means of a pin 302 passing therethrough and through the opening 109 in the central portion 106 of the body member 102. The adapter 300, is only used to receive straight end wiper arms 12. To fit the pin 302 through (or remove the pin from) the adapter 300 and the hole 109, the spring must be urged upward out of position within the recess 310 in the pin. The same spring configuration is used to receive wiper arms which already have a pin connected thereto.

As will be appreciated from the foregoing the subject, heated windshield wiper blade and holder does not expose its relatively rigid heating elements to bending stresses or the ambient atmosphere. The only elements in the electrical circuit which are exposed to bending stresses and the ambient atmosphere are the flexible, insulated conductors. Thus the resulting construction is suitable for effective, long-term use.

Without further elaboration the foregoing will so fully illustrate out invention that others may, by applying current or future knowledge, adopt the same for use under various conditions of service.

We claim:

1. An electrically heated windshield wiper assembly adapted to be mounted on a wiper arm which sweeps across the windshield of a motor vehicle and adapted to be connected to an electrical source, said wiper assembly comprising:

wiper blade means for wiping said windshield;

blade carrier means adapted to receive said wiper blade means for holding said wiper blade means therein in conformation to the shape of windshield, said blade carrier means being connectable to said wiper arm; and heating means passing through said blade carrier means and said wiper blade means for heating said wiper blade means and said blade carrier means, said heating means being adapted to be connected to said electrical power source;

said wiper blade means being comprised of:

resilient blade member means for wiping the surface of said windshield, said blade member means being elongated and having a passageway running longitudinally through the entire length thereof, said passageway being open at each end of said blade member means;

said blade carrier means being comprised of:

a body member having first and second ends, a pair of blade holder members pivotally connected one each to said first and second ends of said body member, each blade holder member having an enclosed hollow interior compartment; and said heating means being comprised of:

a pair of first electrical conductors passing through said body member of said blade carrier means, a first heating element within each enclosed hollow compartment of said blade holder members, each first heating element being an exposed filament connected at a first end thereof to one of said first electrical conductors within said hollow compartment and spaced from the interior surface of said compartment, a second heating element having first and second ends positioned within said passageway in said blade member means, said first and second ends of said second heating element being spaced within said passageway a distance from the respective ends of said passageway, a plurality of second electrical conductors each having a first end and each second electrical conductor at said first end thereof being connected to said second heating element within said passageway in said blade member means, and connecting means located at a second end of each of said first heating elements and at a second end of each of said second conductors for electrically connecting said first heating elements and said second electrical conductors.

2. A wiper assembly as claimed in claim 1, wherein said blade carrier means is formed of a plastic material.

3. A wiper assembly as claimed in claim 2, wherein said plastic material comprises polyester resin.

4. A wiper assembly as claimed in claim 1, wherein said first and second heating elements each comprise a section of solid wire.

5. A wiper assembly as claimed in claim 1, wherein each of said first and second electrical conductors comprises a flexible stranded wire.

6. A wiper assembly as claimed in claim 5, wherein each of said first and second heating elements comprises a solid wire.

7. A wiper assembly as claimed in claim 5, wherein each of said first and second electrical conductors further comprises an electrically insulative coating around said stranded wire.

8. A wiper assembly as claimed in claim 7, wherein each second electrical conductor is welded to said second heating element.

9. A wiper assembly as claimed in claim 1, wherein each second electrical conductor is welded to said second heating element.

10. A wiper assembly as claimed in claim 1, wherein:

said wiper blade means further comprises blade backing means surrounding at least a portion of said blade member means for holding said blade member means therein:

said backing means is comprised of a backing strip in the form of an elongated, channel-shaped member having a pair of longitudinally extending flanges defining a slot therebetween;

said blade member has at least two longitudinally extending recesses, each of said flanges of said backing strip being located within a respective recess in said blade; and said blade holder members hold said backing strip.

11. A wiper assembly as claimed in claim 10, wherein each of said blade holder members includes jaw means for holding said backing strip.

12. A wiper assembly as claimed in claim 11, wherein said backing strip is formed of a plastic material.

13. A wiper assembly as claimed in claim 12, wherein said plastic material is polyarylate resin.

14. A wiper assembly as claimed in claim 1, wherein said passageway through said blade member means includes a slit extending the length of said blade member means and which is adhesively sealed closed after said second heating element is located therein.

15. A wiper blade assembly as claimed in claim 1, wherein said body member has a transverse opening therethrough for connecting said blade carrier means to said wiper arm.

16. A wiper blade assembly as claimed in claim 15, further comprising adapter means connected to said body member through said transverse opening for connecting said blade carrier means to said wiper arm.

17. A wiper blade assembly as claimed in claim 1, wherein each connecting means comprises:
- a female plug affixed in electrical contact to the second end of each first heating element,
- a male plug affixed in electrical contact to the second end of each second conductor,
- said male plug being fittable within said female plug, whereby inserting said first heating element within said female plug causes said first heating element to be electrically connected to said second conductor.

* * * * *